Aug. 1, 1944.  L. FRANKEL  2,354,679
PROJECTOR
Filed July 1, 1940  6 Sheets-Sheet 1

Inventor:
Leo Frankel.
By Chritton, Wiles, Davies, Hirschl & Dawson.
Attys.

Aug. 1, 1944.    L. FRANKEL    2,354,679
PROJECTOR
Filed July 1, 1940    6 Sheets-Sheet 4

Inventor:
Leo Frankel.
By Chritton, Wiles, Davies, Hirschl & Dawson
Attys.

Aug. 1, 1944.  L. FRANKEL  2,354,679
PROJECTOR
Filed July 1, 1940  6 Sheets-Sheet 6

Inventor:
Leo Frankel.
By Chritton, Wiles, Davies, Hirsch, Dawson.
Attys.

Patented Aug. 1, 1944

2,354,679

UNITED STATES PATENT OFFICE 2,354,679

PROJECTOR

Leo Frankel, Chicago, Ill.

Application July 1, 1940, Serial No. 343,487

30 Claims. (Cl. 88—17)

This invention relates to a projector, and more particularly to a motion picture projecting machine which is adapted for use in the projection of pictures from either of two films of different sizes.

One feature of this invention is to provide an apparatus which may be changed from the projection of pictures from a film of one size to a projection of films of another size without disassembling or interchanging the parts of the apparatus, and without impairing the quality of the projected pictures when the change from one size picture to another occurs. Another feature of the invention relates to the improvement of a projecting machine whereby damage to the film, even in the hands of inexperienced operators, is readily prevented, and wherein the machine is conveniently and easily operated. Still another feature is to provide a motion picture projector wherein a single shutter may be used for the projection of either of a pair of films of different sizes. Yet another feature is the arrangement of film transporting and projecting means for each size of film on opposite sides of the casing. A further feature is the provision in a motion picture projecting machine of an arrangement whereby a single light source serves to project the pictures from a plurality of films.

Other features and advantages will appear from the following specification and drawings, in which:

Fig. 5ᵃ is a side elevational view of the structure shown in Fig. 5, with the cover thereof removed.

Figure 1:
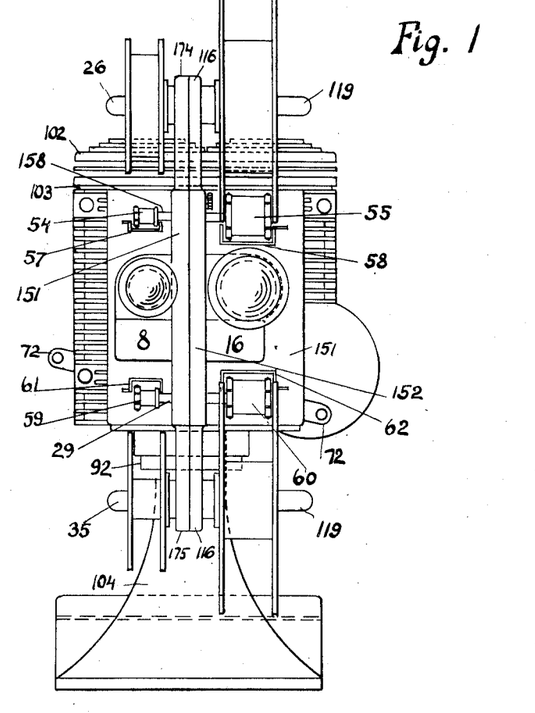
Fig. 1 is a front elevational view of the projecting apparatus.
Figure 2:
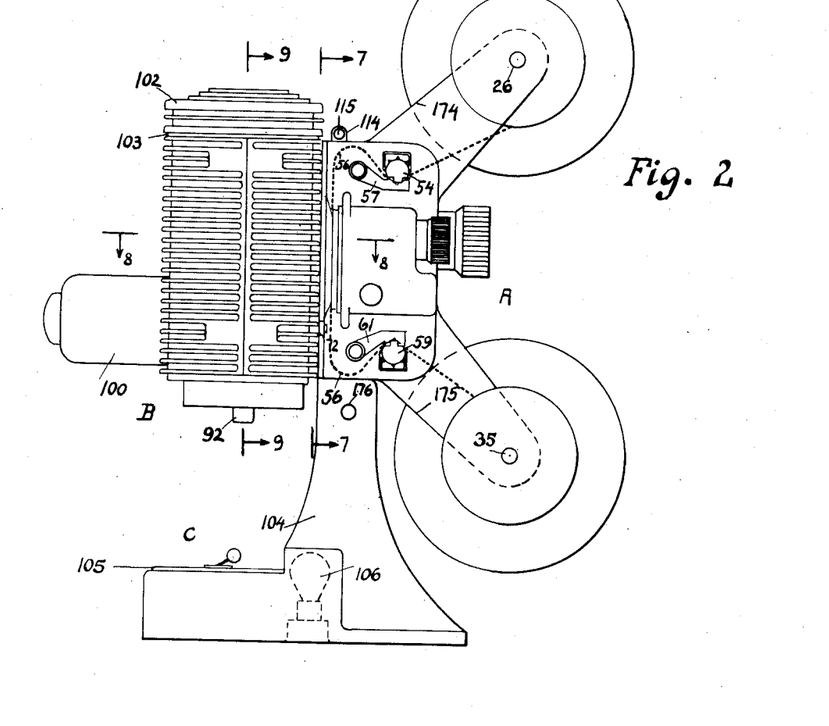
Fig. 2 is a side elevational view of the same.

In the specific embodiment of my invention described herein, and referring particularly to Figs. 1 and 2, the projection machine consists essentially of three main parts. The front part A contains all the driving and film transporting means, and the two projecting lenses, one for each film size. The rear part B contains the projection member with its housing, the light collecting lenses, the driving motor, and the cooling fan. The base C contains most of the electrical connections and provides a switchboard.

Because the projector is adapted for use with two different sizes of film, and because both films are arranged within the apparatus at the same time, it is necessary to provide different transporting means for each of the different sizes of film required. As may be seen in Fig. 1, the film transporting means are so arranged that the corresponding means used with each film size are mounted at opposite ends of a series of shafts. Each shaft carries only one corresponding pair of these transporting means, the ends of the shaft projecting beyond the film transporting means from the sides of the main casing A.

The film transporting means are driven by a plurality of gears arranged in interlocking relation within the casing A. The casing A itself consists of two portions 151 and 152. The portion 151 acts as a housing for all the gears, while the portion 152 serves only as a cover.

Figure 3:
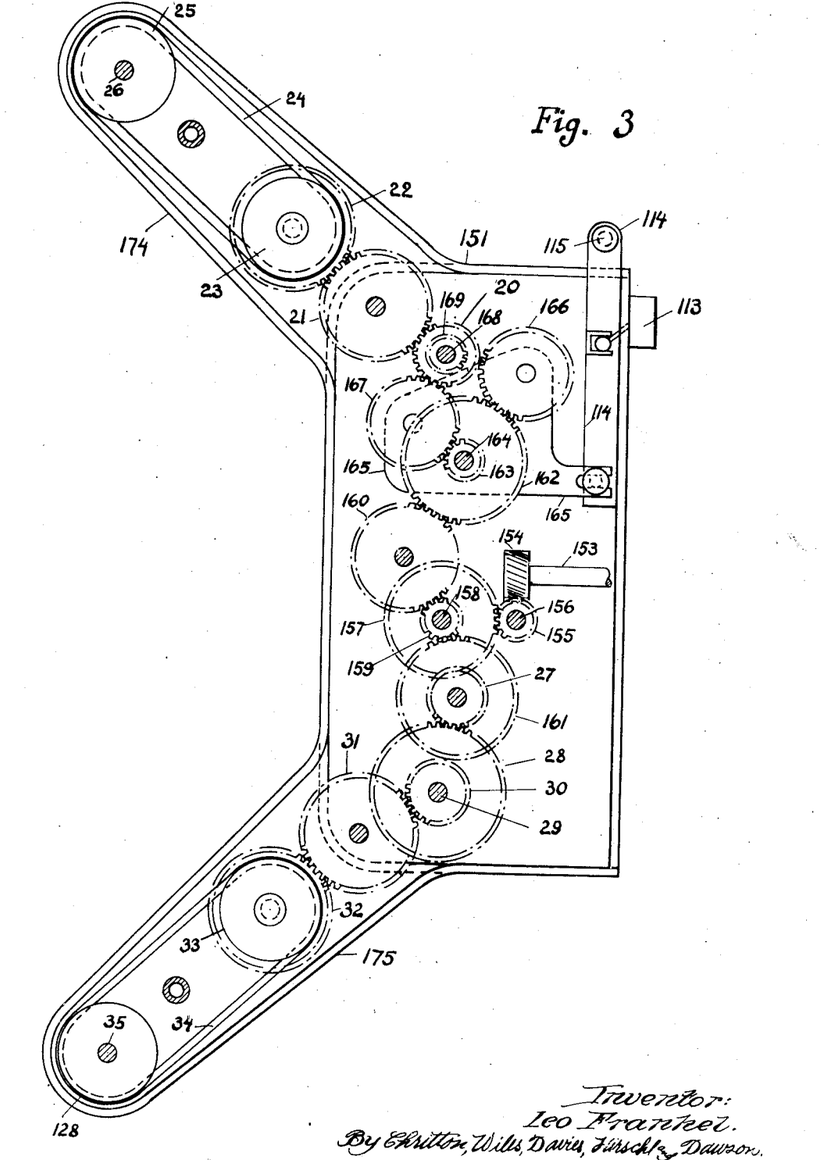
Fig. 3 is a schematic view of the gear-chain mechanism and the safety switch inside the front portion of the machine.

Referring now to Fig. 3, the drive shaft 153 is driven by a motor in a manner to be later described herein. A spiral gear 154, affixed to the shaft, meshes with another spiral gear 155 pressed on the shaft 156. The spiral gear 155 also meshes with the spiral gear 157 on the shaft 158. A pinion 159 on the shaft 158 drives the gears 160 and 161. The gear 162, which is rigidly connected with the pinion 163, in turn is driven by the gear 160. Gear 162 and pinion 163 are rotatably mounted on a pin 164, which serves at the same time as a pivot for a plate 165.

Two gears 166 and 167 are fixedly mounted on the plate 165 in such a way that the gear 166 meshes permanently with the gear 162, and the gear 167 meshes permanently with the pinion 163, regardless of the position of the rotatable plate 165. A shaft 168, with two rigidly connected gears 169 and 20, is arranged in such a manner that the rotation of the plate 165 may cause the gear 166 to mesh with the gear 169 or, instead, the gear 167 to mesh with the gear 20. In this manner, two different speeds of rotation may be provided for the shaft 168, even though the shaft 153 is rotating at a constant speed.

Figure 5:
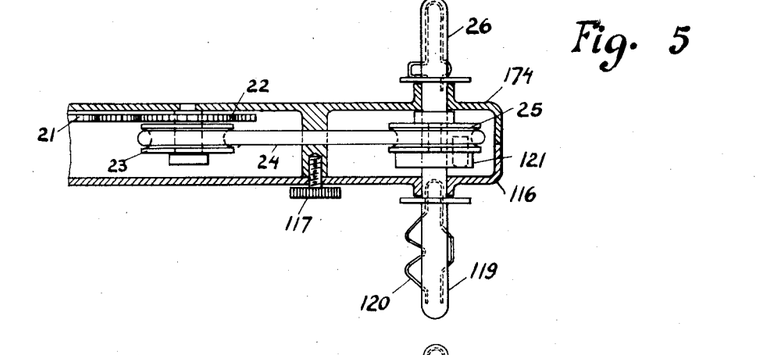
Fig. 5 is a transverse sectional view showing the arm supporting the film reel when adapted for the use of small reels.
Figure 5A:
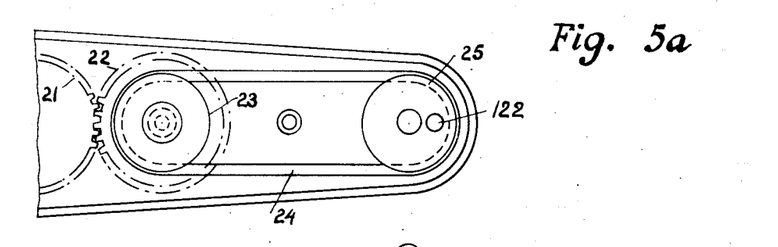

Gear 20 drives the gear 21, which in turn drives the gear 22. As seen in Figs. 5 and 5ᵃ, a pulley 23 may be connected to the gear 22 by means of an overrunning clutch. The clutch is operative to couple the gear 22 and the pulley 23 only when the gear is rotated in one predetermined direction. Any suitable overrunning clutch may be used. Since such clutches are well known in the art, a detailed description thereof is unnecessary.

A belt 24 connects the pulley 23 with a second pulley 25, which is pressed on a shaft 26. The shaft 26 projects through the portion 151 of the casing A and thereby provides a support for a film reel.

Gear 161, driven by the pinion 159, is rigidly connected to gear 27, which drives the gear 28 on the shaft 29. Another gear 30 on the same shaft 29 meshes with a gear 31, which in turn drives a gear 32.

A pulley 33 is connected to the gear 32 by an overrunning clutch similar in construction to the one which couples the gear 22 in the pulley 23. However, the clutch connecting the pulley 33 and the gear 32 is operative to couple these parts only when the gear 32 is rotated in a direction opposite to the direction of rotation of the gear 22, which provides coupling with the pulley 23. Thus at any time only one of the clutches is operative to couple the gear and pulley associated therewith, and the direction of rotation of the whole gear drive mechanism determines which clutch is engaged.

A belt 34 connects the pulley 33 with a second pulley 128 which is carried by the shaft 35. The shaft 35 is constructed and arranged in a manner similar to that of the shaft 26 and serves a similar function.

The shafts 156, 158, 168 and 29 extend through both halves 151 and 152 of the casing A. To the projecting ends of these shafts are attached suitable means for transporting the film.

The movement of the film through the apparatus must be carefully synchronized with the action of the shutter in passing across the picture frame. The shafts 156 and 158 carry two pairs of cams 36, 37, 38 and 39, as seen particularly in Fig. 4. Each cam is angularly disposed in position with respect to the position of the corresponding cam on the other side of the shaft.

Figure 4:
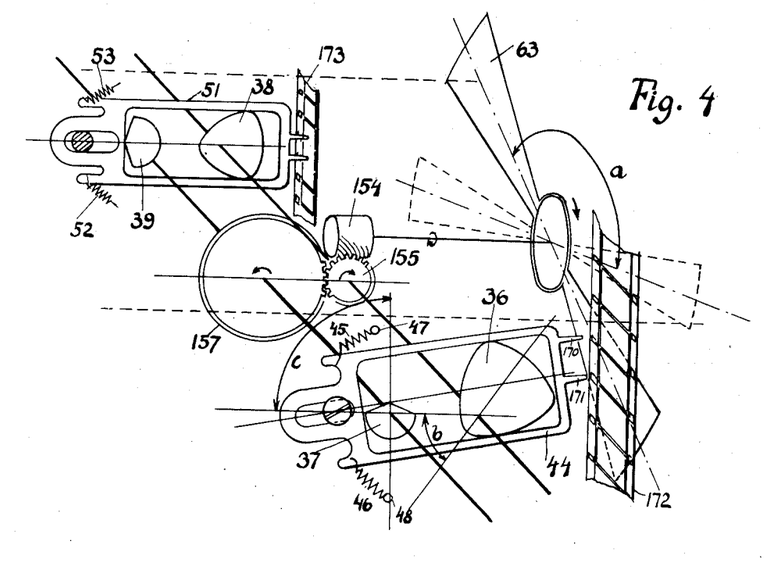
Fig. 4 is a perspective view of the shutter and film transporting mechanism.

Cams 36 and 37 move a claw frame 44, which is provided with extensions 170 and 171 adapted to be received within the perforations of the film ribbon 172. The movement of the claw frame 44, and, therefore, that of the film ribbon 172 depends upon the shape and position of the cams 36 and 37.

Cam 36 is arranged to provide an oscillating movement, while cam 37 effects a lateral reciprocating motion of the claw frame 44. Thus the cam 37 inserts the extensions 170 and 171 onto the perforations of the film 172, and thereafter withdraws the extensions from the perforations. The cam 36 is synchronized with the cam 37 and provides downward movement of the claw frame 44 when the extensions are inserted in the perforations and upward movement of the claw frame when the extensions are withdrawn.

Precise synchronization of the movement of these two cams is highly important. In order to obtain such synchronization, the gear ratio of the spiral gears 155 and 157 connecting the shafts 156 and 158 should be integral, preferably 1, 2 or 3. In this event, each turn of the shaft 158 corresponds to the transport of one frame of the film 172.

Two springs 45 and 46 yieldingly urge the claw frame 44 towards the film 172, thus providing a close contact between the claw frame 44 and the cam 37. The opposite ends of the springs 45 and 46 are secured to the pins 47 and 48, respectively. Similarly, on the other side of the casing A, two springs 52 and 53 serve to yieldingly urge the claw frame 51 into engagement with the cam 39.

The arrangement of the two pairs of cams in connection with the two claw frames differs in that the cams 38 and 39 are of slightly different shapes to correspond to different dimensions of the second film 173. In other respects, the action of the cams 38 and 39 on the claw frame 51 is similar to that of the cams 36 and 37 on the claw frame 44.

As seen particularly in Figs. 1 and 2, a pair of film sprockets 54 and 55 are attached to opposite ends of the shaft 168, each of the film sprockets being constructed to engage a film of a predetermined size. The dimensions of the film sprockets, therefore, correspond to the dimensions of the two films which are to be used in the apparatus.

The film sprockets 54 and 55 transport the film through the apparatus, forming a loop 56 to decrease the amount of film which is transported intermittently by the claw frames 44 and 51. A pair of U-shaped members 57 and 58 are associated with the sprockets 54 and 55, respectively, and serve to prevent the film from slipping from the sprockets.

In the lower portion of the apparatus, another pair of film sprockets are attached to the opposite ends of the shaft 29. These sprockets 59 and 60, together with a pair of U-shaped members 61 and 62, are similar in construction and arrangement to the sprockets 54 and 55 and the members 57 and 58.

The apparatus is equipped with a single shutter 63 (as seen particularly in Fig. 7), which serves to shut off all of the light passing through either of the films while the film is in motion.

Referring now to Fig. 4, it may be seen that the shutter 63 interrupts the light beams at different times. Accordingly, it is necessary that the claw frames 44 and 51 be actuated at different times and in synchronization with the movement of the shutter. It is for this reason that the cams 36 and 38 on the shaft 156 and the cams 37 and 39 on the shaft 158 are displaced or angularly disposed with respect to each other.

Thus if the angle between the two positions of the shutter 63 in which it interrupts both light beams is $a$, then the angle $b$ of the displacement of the cams 36 and 37 must be $a \times p$, where $p$ is the ratio of the gearing of the spiral gears 154 and 155. The angular displacement $c$ of the cams 38 and 39 on the shaft 158 must similarly be $b \times q$, where $q$ is the ratio of the gearing of the spiral gears 155 and 157.

Referring once more to Fig. 7, a gear 64 is rigidly connected with the shaft 153 and the shutter 63. This gear is driven by a second gear 65, which in turn is rigidly secured to a friction wheel 66. Another friction wheel 67 is attached to the shaft 68 of the motor 100. A third friction wheel 69 is pressed by a strong spring 70 toward a position of engagement with the wheels 66 and 67, as shown in dotted lines in Fig. 7. In this manner, the motion of the wheel 67 is transmitted to the wheel 66, gears 65 and 64, shutter 63, and the shaft 153, and from this latter shaft to the whole film transporting mechanism, previously described.

The friction wheel 69 is affixed to a bracket 71 movably mounted on a lever 72 by a pivot 73. If the lever 72 is turned clockwise to the position seen in solid line in Fig. 7, the bracket 71 moves the friction wheel 69 away from the friction wheel 67, thus interrupting the transmission of movement from the motor drive shaft 68 to the film transporting mechanism.

Figure 7:
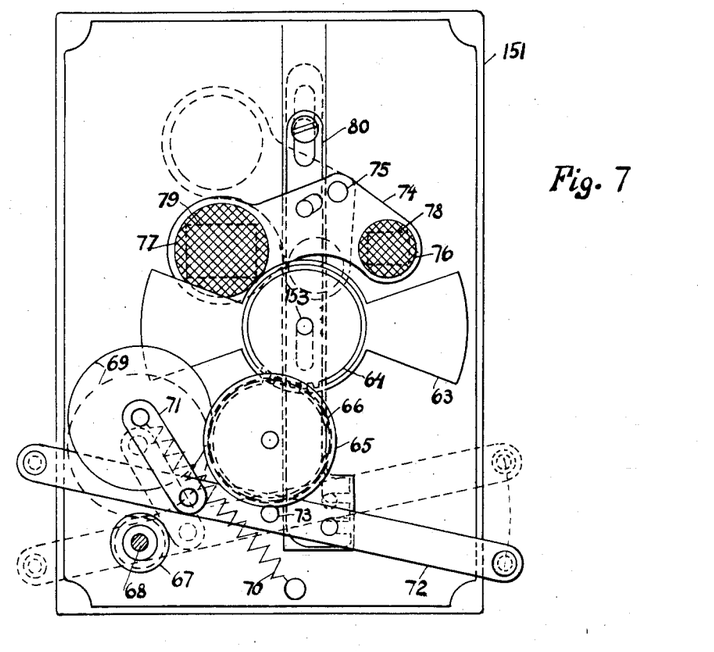
Fig. 7 is an elevational view of the interior of the machine taken on the line 7—7 of Fig. 2.

By interrupting the movement of the film transporting mechanism, it is possible to provide for the projection of single pictures of a film. Under these circumstances, the film remains motionless and hence is subjected to relatively high temperature caused by the heat generated by the projection lamp. To prevent damage to the film when the film transporting mechanism is disengaged, means are provided to decrease the heating of the film. A safety shutter frame 74, movably mounted on a pivot 75, is equipped with a pair of transparent or at least translucent heat absorbing disks 76 and 77.

In the position of the safety shutter frame 74, shown in solid lines in Fig. 7, the heat absorbing disks 76 and 77 are located in the path of the light beams, which may be concentrated on the film through the film apertures or frames 78 and 79. The frames 78 and 79 frame the pictures of the film in the conventional manner, one of the frames being of a size suitable for the narrower film, an 8 mm. film, and the other frame being suitable for use with the wider film, for example, a 16 mm. film.

If the lever 72 is tilted to engage the friction wheels 66, 68 and 69, the member secured to the lever 72 is moved upwardly and swings the frame 74 on the pivot 75 out of the path of the light beams. This latter position is shown in dotted lines in Fig. 7. Accordingly, when the lever 72 is moved to disengage the friction wheels, the safety shutter 74 is automatically moved into a position wherein the light beams are intercepted, and the radiated heat falling on the film is substantially reduced.

Figure 8:
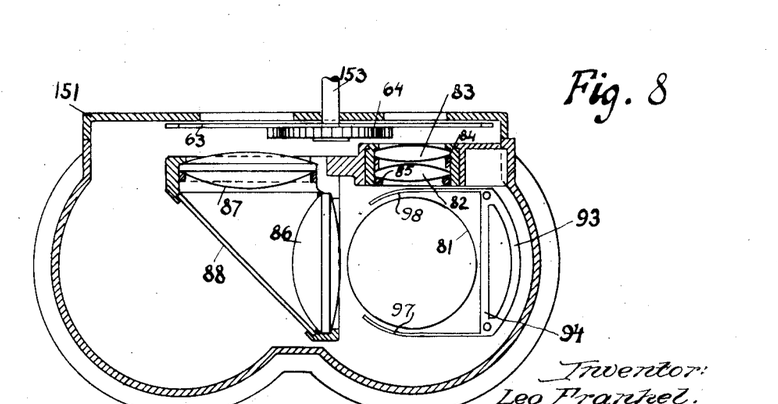
Fig. 8 is a sectional view along the line 8—8 of Fig. 2.
Figure 9:
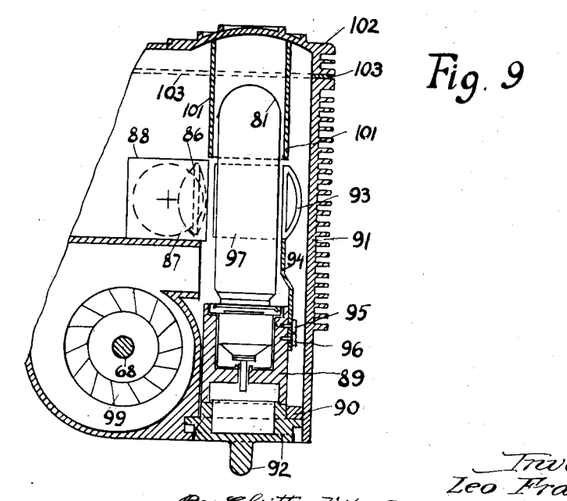
Fig. 9 is a sectional view along the line 9—9 of Fig. 2.

Both films may be projected with the use of only a single light source. As seen in Fig. 8, a projection lamp 81 may be placed directly behind one of the lamp frames or apertures 78. A light collecting condenser system, including a pair of lenses 82 and 83, a spacing ring 84, and a bushing 85 may be placed between the lamp 81 and the aperture 78 in such a manner that the maximum quantity of light emitted from the lamp 81 is concentrated on the film aperture 78.

Since it is not possible to align the lamp directly with both film apertures, the second film aperture 79 is illuminated by means of a mirror arrangement. Immediately before the aperture 79 is placed a condenser system, including the lenses 86 and 87. A mirror 88 is positioned between the lamp 81 and the condenser system, whereby the light emitted from the light source 81 is directed by reflection from the mirror 88 to the film aperture 79. The light beam thus delivered to the film aperture 79 is substantially parallel to the beam delivered to the aperture 78.

If a standard projection lamp is used as a light source, it is desirable to arrange for the rotation of the lamp in order to direct the maximum quantity of light upon the film aperture which is in use. Lamps of this character are usually constructed in such a way that a large portion of the total light emitted from the lamp is concentrated in a single direction.

Since the two film apertures are not used simultaneously, but, rather, alternately, it is possible, by rotating the lamp on its axis, to arrange for the maximum concentration of light on the film aperture which is in use. To accomplish this rotation of the lamp, the lamp base 89, which is of standard construction, may be secured to a flanged member 90 in any suitable manner. The member 90 fits into an opening in the lamp housing 91, which is so shaped that it provides a bearing for the member 90, the axis of which is the same as the axis of the lamp 81.

The member 90 is equipped with a knob 92 on the lower portion thereof, which knob can be rotated by the operator of the projecting machine. When the knob 92 is rotated, the member 90 and lamp 81 will in turn rotate about the centrally vertical axis of the lamp. A pair of suitable stops (not shown) may be provided to limit this movement.

If desired, the lamp housing may also be provided with a concave mirror 93 positioned behind the lamp 81. The mirror 93 may be mounted on an elongated support 94, the lower portion of which is fixedly attached to the lamp base 89 by means of small screws 95 and 96. The same screws may also serve to provide an accurate adjustment of the position of the mirror 93 with respect to the lamp 81.

When the lamp 81 is rotated, the mirror 93 is moved around the same axis and does not change in position with respect to the lamp 81. Hence, the mirror 93 always reflects the light in the direction in which the lamp is turned. A pair of shields 97 and 98, arranged on the mirror holder 94, prevent the light emitted from the lamp 81 from illuminating the film aperture which is not in use.

In the lower part of the lamp housing 91, a rotatable fan 99 is arranged for the ventilation of the housing. The fan 99 may be rigidly attached to the shaft 68 of the motor 100 and will be rotated whenever the motor is in operation. The fan 99 forces a large quantity of air through the lamp housing, thus cooling the projection lamp 81 and all adjacent parts, and avoiding excessive heat which might otherwise damage the lamp or other members.

A metal tube 101 is arranged around the lamp 81 to direct the air along the surface of the lamp. This tube is secured to the top cover 102 of the lamp housing 91, and is preferably composed of a heat conducting material in order that heat generated by the lamp may be transported through the metal tube 101 to the top cover 102, which is cooled by the outside air. A ring 103, preferably made of heat insulating material, is inserted between the lamp housing 91 and the top cover 102 to prevent heat transfer between these parts.

The motor 100 may be mounted on the rear side of the lamp housing 91, with its shaft 68 extending into the housing and driving friction wheel 67 and the rotatable fan 99.

As seen particularly in Figs. 1 and 2, a hollow base 104 supports the projecting apparatus, and is secured thereto by means of a screw 176 which holds the two parts firmly together, but permits tilting of the projecting machine to any desired angle within predetermined limits. At the junction point between the base 104 and the projecting machine, insulated wires leading from the lamp base 89 and the motor 100 are passed through openings in the base and are carried to the switches and other regulating means on the lower portion of the base.

For the convenience of the operator, all of the switches and knobs are placed together on a switchboard 105. The switchboard is preferably made of transparent material and is illuminated from its edge by a small lamp 106 mounted inside the base 104. This lamp 106 is connected in such a manner that it is illuminated while the projecting machine is connected to the power line (see Fig. 11).

Figure 10:
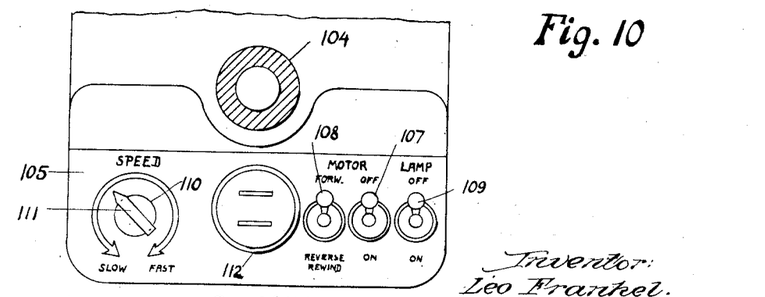
Fig. 10 is a plan view of the base showing the arrangement of switches and other regulating means.
Figure 11:
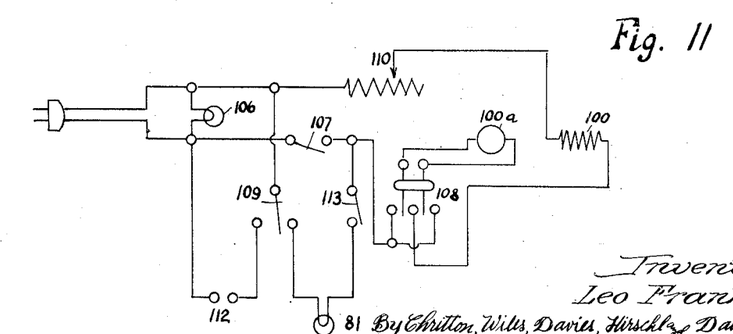
Fig. 11 is a diagrammatic view illustrating the electrical circuit of the apparatus.

Referring particularly to Figs. 10 and 11, three switches 107, 108 and 109 are provided for controlling the operation of the apparatus. The switch 107 connects the motor 100 with the power line, while the switch 108, of the double-pole, double-throw type, permits the reversal of the direction of flow of the current passing through the motor armature 100a, and thus the reversal of the rotation of the motor and the entire film transporting mechanism. A rheostat 110, which can be operated by a knob 11, permits the variation of the speed of the motor 100. A third switch 109 is in the circuit of the projection lamp 81.

This lamp 81 is so connected that the circuit is closed only when both of the switches 107 and 109 are in "on" position. With this arrangement, the lamp 81 cannot be illuminated unless the motor 100 and cooling fan 99 are in operation.

The switch 109 is also connected to a plug receptacle in such a manner that this receptacle or the lamp 81 may be alternately connected to the power line. This latter construction permits the use of a special threading light or of a separate lamp which illuminates the room while the pictures are not being projected. As the projection begins, this threading light or this lamp, if plugged into the receptacle 112, is switched off.

The circuit of the projection lamp 81 is also equipped with a switch 113, as seen in Figs. 3 and 11. This switch is located in the casing 151 and is connected with the plate 165 by a lever 114. This switch is in "off" position when the gear 166 meshes with the gear 169, in which case the shaft 168 and all of the gears and pulleys actuated thereby rotate faster than they would if the plate 165 was in its other position. A knob 115 on the lever 114 is used for the operation of the lever and the switch 113.

After the projector has been connected to the power-line, the reel on which the film which should be projected is wound is put on shaft 26 (Fig. 2). One end of the film is threaded under the sprocket 54 and pressed towards it by the U-shaped piece 57. After forming the loop 56 the film passes the film-aperture (not shown in Fig. 2). Then a second loop 56 is formed and the film is threaded around the sprocket 59. Another U-shaped piece 61 presses the film against this sprocket. The film is then wound on a second reel on shaft 35.

After threading, the knob 92 is turned to that position in which the lamp 81 illuminates the film-aperture before which the threaded film passes. The projector is now ready for use. With switch 108 in its "forward" position, switch 107 is thrown into its "on" position. The motor 100 starts turning and brings the threaded film into motion. Then the projection lamp 81 may be turned on by throwing switch 109 into its "on" position and the projection starts. As pointed out before, any other lamp whether used as general room illumination or for threading the film is turned off at the same time if it is connected to the plug receptacle 104.

During the projection, single pictures of the projected film may be shown. By turning lever 72 on one of its knobs in clockwise direction (when seen in the direction of the projecting light), the power connection between the motor and film feeding mechanism is interrupted and at the same time the film secured against excessive heat from the projection lamp. The lever 72 has to be held in this turned position as long as the projection of the single picture is desired. The lever 72 returns automatically into its original position when released.

If the operator desires to show parts of the film again which have already been projected or wants to reverse the direction of any motions shown on this film, he brings switch 108 into its "reverse" position. By this operation, the direction of rotation of the motor and thus of the whole film feeding mechanism is reversed. The film is then wound from the reel on shaft 35 to the reel on shaft 26. The two overrunning clutches in connection with the pulleys 23 and 33 are so adjusted that always that pulley is coupled with the rest of the driving mechanism which turns by means of the belt 24 or 34 respectively and the pulley 25 and 128 respectively the shaft 26 or 35, the motion of which is required to wind the film on the respective reel turned in the right direction. No other levers or knobs have to be operated therefor.

When it is desired to rewind a film reel after projection, it is possible to shift the lever 114 to increase the speed of rotation of the winding or film transporting means. When the lever 114 is so moved, the switch 113 is automatically operated to shut off the projection light, even if the operator has neglected to open the switch 108.

For projection of films of the other size, the operation remains essentially the same: The reel with the film is placed on the upper shaft 119 (Fig. 1), the film then threaded around the sprocket 55 and pressed toward it by the U-shaped piece 58. After forming a loop, the film passes the other film-aperture, forms another loop, and is threaded around the sprocket 60. The U-shaped piece 62 presses the film against the sprocket. The film is then wound on a reel placed on the lower shaft 119. After threading, the knob 92 (Fig. 2) is turned into its other position, thus directing the light of the projection lamp 81 on the right film-aperture.

The operation of the single frame lever 72 and the switch 108 for reversing the direction of motion of the projector is exactly the same as described for the other film size.

The extension 174 of the casing 151, containing the gear 22, pulleys 23 and 25, and the belt 24, is equipped with a cover 116, as seen particularly in Fig. 5. This cover is removably attached to the casing 151 by a screw 117, and may be removed in order to permit exchange or replacement of the belt 24.

With this construction, a shaft 26 can be used only for spools of a single film size on one side of the projecting machine. The shaft is hollow and slotted on two sides. Within the shaft is placed a specially shaped spring 118, which extends through the two slots. One prong of this spring holds the spool in position and prevents it from slipping from the shaft 26. The second prong of the spring 118 engages the slots of standard film spools and serves as a coupling means between the shaft 26 and the spool.

A second shaft 119 is also assembled into the cover 116. This second shaft is hollow and slotted, and equipped with a spring 120. The spring 120 is bent according to the requirement of the film spools of the second size with which it is to be used. In this spring, one prong holds the spool in place on the shaft 118, while the other acts as a coupling member.

The shaft 119 is equipped with a plate 121 having an armature therein eccentrically disposed with respect to the central axis of the plate. A pin 122, pressed into the pulley 25, extends into this aperture in the plate 121 and couples the shafts 26 and 119.

Figure 6:
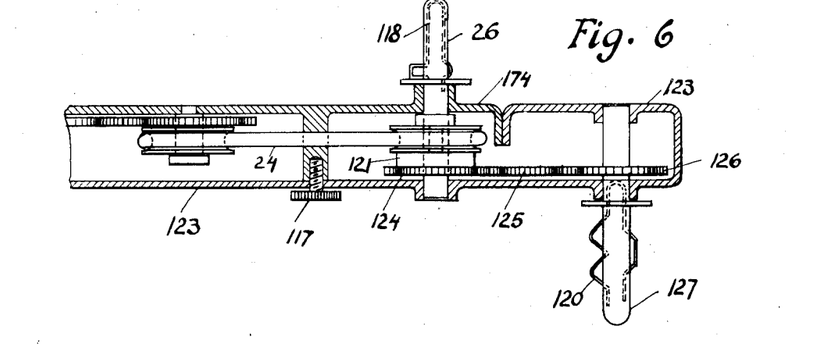
Fig. 6 is a transverse sectional view of the arm shown in Fig. 5 when adapted for the use of large reels.

If the use of larger spools is required, the cover 116 may be replaced by the cover 123 shown in Fig. 6. In this event, the pin 122 of the pulley 25 extends into an aperture in a gear 124, which is thus coupled with the shaft 26. The gear 124 meshes with a gear 125, which in turn drives a gear 126 on the shaft 127.

The shaft 127 is similar to the shaft 119 and is equipped with a spring such as the spring 120 for receiving the film spool. The cover 123 is secured to the casing 151 by the screw 117.

The extension 175 of the casing 151, containing the shaft 35, is exactly analogous in construction to the extension 174, and, therefore, is not described in detail here.

While there are shown and described certain embodiments of the invention, it is to be understood that it is capable of many modifications. Changes, therefore, in the construction and arrangement may be made without departing from the spirit and scope of the invention as disclosed, in the appended claims.

I claim:

1. In a motion picture projecting apparatus adapted to project pictures from a pair of films of different sizes, a casing, a plurality of shafts in said casing, said shafts projecting therebeyond at opposite sides thereof, a plurality of gears arranged in said casing for rotating said shafts, single power means for actuating said gears, film transporting means for one of said films mounted on said shafts on one side of said casing, and film transporting means for the other of said films mounted on said shafts on the opposite side of said casing, corresponding means for transporting each of said films being mounted on opposite ends of the same shafts.

2. In apparatus for projecting motion pictures from a pair of films of different sizes, a casing, a plurality of shafts in said casing, said shafts projecting therebeyond at opposite sides thereof, a plurality of gears arranged in said casing for rotating said shafts, single power means for actuating said gears, film transporting means for one of said films mounted on said shafts on one side of said casing, said means including a pair of sprockets and a pair of film spools, and film transporting means for the other of said films mounted on said shafts on the opposite side of said casing, said last mentioned means including a pair of sprockets and a pair of spools, corresponding sprockets and spools of each film transporting means being mounted on opposite ends of the same shafts.

3. In a projector of the character described, a light housing, a light source in said housing, a gear housing secured to said light housing and having a plurality of shafts projecting entirely therethrough so as to extend at opposite sides thereof, feed and take-up mechanism for films of different sizes on opposite projecting ends of said extending shafts, a gear train disposed in the gear housing connecting said shafts to drive the same at predetermined related speeds, an electric motor for driving said gear train, a transport mechanism for each film synchronized with said extending shafts whereby to permit effective transporting of either film without adjustment of any of the transporting mechanism therefor, a separate lens system for each film and means for directing light from the light source to either one of said lens systems while shielding the light from the remaining lens system.

4. In a projector of the character described, a light housing, a light source in said housing, a gear housing secured to said light housing and having a plurality of shafts projecting entirely therethrough so as to extend at opposite sides thereof, feed and take-up mechanism for films of different sizes on opposite projecting ends of said extending shafts, a gear train disposed in the gear housing connecting said shafts to drive the same at predetermined related speeds, an electric motor for driving said gear train, a transport mechanism for each film synchronized with said extending shafts whereby to permit effective transporting of either film without adjustment of any of the transporting mechanism therefor, a separate lens system for each film and means for directing light from the light source to either one of said lens systems while shielding the light from the remaining lens system, said last mentioned means including means to place said light source at effectively a greater distance from the larger film than from the smaller film.

5. In a projector of the character described, a light housing, a light source in said housing, a gear housing secured to said light housing and having a plurality of shafts projecting entirely therethrough so as to extend at opposite sides thereof, feed and take-up mechanism for films of different sizes on opposite projecting ends of said extending shafts, a gear train disposed in the gear housing connecting said shafts to drive the same at predetermined related speeds, an electric motor for driving said gear train, a transporting mechanism for each film synchronized with said extending shafts whereby to permit effective transporting of either film without adjustment of any of the transporting mechanism therefor, a separate lens system for each film, means for directing light from said light source selectively to either lens system, manually operable means for breaking the drive connection from the motor to said gear train, and means responsive to operation of said last mentioned manual means for decreasing the light delivered through both lens systems, whereby on operation of said manually operable means film movement is arrested independently of which size of film may be in use, so that a single picture will be shown on a screen, and whereby as an incident to the showing of a single picture the amount of light delivered through the film is decreased.

6. In a projector of the character described, a plurality of shafts, means associated with the shafts for transporting films of two different sizes, single drive means including a train of gears for operating both film transporting means, separate means for framing the pictures of each film, a lens system for each film, a single source of light adjustable to deliver light through either framing means and lens system, a pivoted shield frame having two light shields adapted to be moved in the path of the light passing through said framing means but normally positioned so as not to intercept said light, means for rotating said shield frame on its pivot to place said light shields in position to obscure the light from the light source through either of said framing means, and means for concomitantly mechanically disengaging the said gear train from a power source whereby, independently of the size of film employed, the film movement may be arrested to show a single picture and the amount of light passing through the film is decreased.

7. A projector as defined in claim 6 including a manually operated lever, spring biased in one direction, a connection between said manually operated lever and said shield frame, a friction clutch in the mechanical drive from the power source to said gear train, and a connection from said manually operable lever to said friction clutch, the construction and arrangement being such that when said manually operable lever is held against the tension of its biasing spring, said clutch is held out of engagement and the light shields are held in the path of the light to show a single picture, but release of the manually operable lever causes it to return automatically to its normal position, engage the said clutch to automatically return the projector to full operation and deliver the full amount of light to the film.

8. In a projector of the character described, a light housing, a light source in said housing, a shield around part of said light source, a gear housing secured to said light housing and having a plurality of shafts projecting entirely therethrough so as to extend at opposite sides thereof, feed and take-up mechanism for films of different sizes on opposite projecting ends of said extending shafts, a gear train disposed in the gear housing connecting said shafts to drive the same at predetermined related speeds, an electric motor for driving said gear train, a transport mechanism for each film synchronized with said extending shafts whereby to permit effective transporting of either film without adjustment of any of the transporting mechanism therefor, a separate lens system for each film, the lens system for the larger film including a mirror for reflecting light at right angles from the light source toward the film, and means extending exteriorly of the light housing for rotating the light source to direct the same to either one of said lens systems while shielding the light from the remaining lens system.

9. In a projector of the character described, a light housing, a light source in said housing, a shield around part of said light source, a gear housing secured to said light housing and having a plurality of shafts projecting entirely therethrough so as to extend at opposite sides thereof, feed and take-up mechanism for films of different sizes on opposite projecting ends of said extending shafts, a gear train disposed in the gear housing connecting said shafts to drive the same at predetermined related speeds, an electric motor for driving said gear train, a film transporting mechanism synchronized with said [shafts whereby] to permit effective [transporting] without adjustment of [any of the] mechanism therefor, a [separate lens system for each] film, the lens system [for the larger film] including a mirror for re[flecting light] from the light source [toward the film, and means extend]ing exteriorly of the [light housing for rotating the l]ight source to di[rect the same to either one of s]aid lens systems [while shielding the light from the] remaining lens [system, and means for arresting in] turn with said [film transporting mechanism to] either lens sys[tem.

10. In a projector of the charac]ter described, a [light housing, a light source in said] housing, a gear [housing secured to said light hou]sing and having [a plurality of shafts projecting] entirely therethrough so as to extend at opp]osite sides thereof, film transporting sprockets and reel supporting means for films of different sizes on opposite projecting ends of said extending shafts, so that one size film is supported at one side of the projector and another size film on the opposite side of the projector, a gear train disposed in the gear housing connecting said shafts to drive the same at predetermined related speeds, an electric motor for driving said gear train, a claw mechanism for each film synchronized with said extending shafts whereby to permit effective transporting of either film without adjustment of any of the transporting mechanism therefor, a separate lens system for each film and manually operable means for directing light from the light source to either one of said lens systems while shielding the light from the remaining lens system, said last mentioned means functioning to place said light source at effectively a greater distance from the larger film than from the smaller film, whereby said projector may be operated on either size film entering without adjustment except for controlling the position of said light directing means.

11. In a projector of the character described, a light housing, a light source in said housing, a gear housing secured to said light housing and having a plurality of shafts projecting entirely therethrough so as to extend at opposite sides thereof, film transporting sprockets and reel supporting means for films of different sizes on opposite projecting ends of said extending shafts, so that one size film is supported at one side of the projector and another size film on the opposite side of the projector, a gear train disposed in the gear housing connecting said shafts to drive the same at predetermined related speeds, an electric motor for driving said gear train, a claw mechanism for each film synchronized with said extending shafts whereby to permit effective transporting of either film without adjustment of any of the transporting mechanism therefor, a separate lens system for each film, manually operable means for directing light from the light source to either one of said lens systems while shielding the light from the remaining lens system, said last mentioned means functioning to place said light source at effectively a greater distance from the larger film than from the smaller film, a driving motor, a connection between the driving motor and said train of gears, and manually operable means for mechanically disconnecting said gear train from said driving motor whereby to arrest movement of either film which may be in use and show a single picture, whereby said projector may be operated on either size film entering without adjustment except for controlling the position of said light directing means.

12. In a projector of the character described, a light housing, a light source in said housing, a gear housing secured to said light housing and having a plurality of shafts projecting entirely therethrough so as to extend at opposite sides thereof, film transporting sprockets and reel supporting means for films of different sizes on opposite projecting ends of said extending shafts, so that one size film is supported at one side of the projector and another size film on the opposite side of the projector, a gear train disposed in the gear housing connecting said shafts to drive the same at predetermined related speeds, an electric motor for driving said gear train, a claw mechanism for each film synchronized with said extending shafts whereby to permit effective transporting of either film without adjustment of any of the transporting mechanism therefor, a separate lens system for each film, manually operable means for directing light from the light source to either one of said lens systems while shielding the light from the remaining lens system, said last mentioned means functioning to place said light source at effectively a greater distance from the larger film than from the smaller film, a driving motor, a connection between the driving motor and said train of gears, manually operable means for mechanically disconnecting said gear train from said driving motor whereby to arrest movement of either film which may be in use and show a single picture, a frame carrying a pair of light shields, one for interposition in the path of light delivered through each lens system, and means responsive to disconnecting said power source and train of gears for moving said shield carrying frame to place said light shields in line with said path of light, whereby said projector may be operated on either size film entering without adjustment except for controlling the position of said light directing means.

13. In a projector of the character described, a plurality of shafts, means associated with the shafts for transporting films of two different sizes, single drive means including a train of gears for operating both film transporting means, separate means for framing the pictures of each film, a lens system for each film, a single source of light adjustable to deliver light through either framing means and lens system, a shield frame having two light shields mounted to be moved in the path of the light passing through said framing means but normally positioned so as not to intercept said light, means for moving said shield frame to place the said light shields carried thereby in position to obscure the light from the light source through either of said framing means, and means for concomitantly mechanically disengaging the said gear train from a power source whereby independently of the size of film employed the film movement may be arrested to show a single picture and the amount of light passing through the film is decreased.

14. In a projector of the character described, a frame body comprising a lamp housing, a gear casing and a gear casing extension, a light source at one side of said light housing substantially in line with a framing aperture for framing a picture on a film of relatively small size, a condensing lens system between the light source and said framing aperture, a condenser lens system adjacent a framing aperture for framing a picture of relatively large size spaced from said first mentioned framing aperture, a mirror for receiving light from said light source and delivering the same to the second mentioned condenser lens system positioned so that the total path through which the light travels through second condenser lens system is substantially greater than the length of the light path through the first mentioned lens system, whereby the length of the light beam and the condensing lenses employed together will produce optimum lighting conditions for each of two sizes of film, a rotatable support for said lamp, said rotatable support carrying shields whereby to permit directing the light from the light source to either lens system while shielding the light from the other lens system, a plurality of shafts extending through said gear housing extension, film transporting sprockets at said projecting ends of said shafts, two claw mechanisms, one for each size of film and both continuously operated from said shafts, whereby either size of film may be mounted for operation on the projector without mechanical adjustments of any kind, the sole adjustment comprising rotating said light support to direct the light through the lens system corresponding to the film being used.

15. In a projector of the character described, a frame body comprising a lamp housing, a gear casing and a gear casing extension, a light source at one side of said light housing substantially in line with a framing aperture for framing a picture on a film of relatively small size, a condensing lens system between the light source and said framing aperture, a condenser lens system adjacent a framing aperture for framing a picture of relatively large size spaced from said first mentioned framing aperture, a mirror for receiving light from said light source and delivering the same to the second mentioned condenser lens system positioned so that the total path through which the light travels through the second condenser lens system is substantially greater than the length of the light path through the first mentioned lens system, whereby the length of the light beam and the condensing lenses employed together will produce optimum lighting conditions for each of two sizes of film, a rotatable support for said lamp, said rotatable support carrying shields whereby to permit directing the light from the light source to either lens system while shielding the light from the other lens system, a shaft, the axis of which is parallel to the light beams directed to the framing apertures, said shaft supported at a point generally between said framing apertures, a shutter mounted on said shaft for interrupting the passage of light through either of said framing apertures, a motor, a drive connection from said motor to said shaft, a plurality of shafts extending through said gear housing extension all in planes at right angles to the plane of said first mentioned shaft, a gear train for driving all of said last mentioned shafts from said first mentioned shaft, sprockets carried at projecting ends of said last mentioned shafts, and a pair of claw mechanisms driven from one of said shafts synchronized with said sprockets whereby a film of either size may be transported past its framing aperture without mechanical adjustment of said shutter or any part of the film transporting mechanism including said sprockets and claw mechanisms.

16. A projector as defined in claim 15 including a friction clutch disposed in the drive connection between the motor and said first mentioned shaft and means extending exteriorly of the housing for disengaging said clutch whereby to permit the showing of a single picture, said last mentioned means being spring biased to return to normal position and engage the said friction clutch when disengaged by the hand.

17. A projector as defined in claim 15 including a friction clutch disposed in the drive connection between the motor and said first mentioned shaft, means extending exteriorly of the housing for disengaging said clutch whereby to permit the showing of a single picture, said last mentioned means being spring biased to return to normal position and engage the said friction clutch when disengaged by the hand, a pair of light shields, one adapted to be placed in the path of the light beam to each film, and both normally supported out of the path of said light beams, and means effective on operation of the clutch disengaging means for moving both of said light shields to light shielding position in the paths of said light beams.

18. A projector as defined in claim 15 including a friction disk driven by the motor, a driven friction disk mounted on said first mentioned shaft, an idler friction disk in engagement with said driven friction disk, a manually operable centrally pivoted lever having its ends extending beyond the housing for manual engagement, a friction disk carried by said lever, and spring means for urging said lever to a position to cause said last mentioned disk to engage both the first mentioned friction disk and said idler disk, whereby movement of said lever is effective to interrupt the drive to said first mentioned shaft to permit showing of a single picture, and release of said lever by the hand will automatically restore the parts to driving position and again cause operation of the projector.

19. In a projector of the character described, a gear casing, a train of gears therein, shafts connected to said gears extending through said casing, film transporting means for films of larger and smaller size associated with said shafts, including sprockets on projecting opposite ends of said shafts, casing extensions above and below said gear casing, shafts extending through ends of said casing extensions with the extending ends constructed to receive supply and take up reels for films of large and small size at opposite sides of the said casing extensions, pulleys on said shafts within said casing extensions, and belt means, including overrunning clutches for driving said pulleys, corresponding film transporting means for the two films being mounted on opposite ends of the same shafts.

20. In a projector of the character described, a gear casing, a train of gears therein, shafts connected to said gears extending through said casing, film transporting means for films of larger and smaller size associated with said shafts, including sprockets on projecting opposite ends of said shafts, casing extensions above and below said gear casing, shafts extending through ends of said casing extensions with the extending ends constructed to receive supply and take up reels for films of large and small size at opposite sides of the said casing extensions, pulleys on said shafts within said casing extensions, and belt means, including overrunning clutches for driving said pulleys, said reel shafts being two part, one part for supporting the reel for the smaller film being carried by the pulley, and one part being journalled in a removable portion of the casing extension, whereby to permit removal of said casing extension to also remove the shaft for carrying the reel for the larger size of film.

21. The combination with a projector as defined in claim 20, of a separable casing extension having an idler shaft engageable with that part of the said two part shaft carried by the pulley, a spaced reel carrying shaft journalled in said separable casing, gears on each of said shafts, and an idler gear therebetween, whereby the point of support of the reels for the larger size film may be extended beyond that of the point of support for the smaller size film, and a larger capacity of film may be accommodated.

22. In a projector of the character described, a light housing, a light source in said housing, a gear housing secured to said light housing and having a plurality of shafts projecting entirely therethrough so as to extend at opposite sides thereof, feed and take-up mechanism for films of different sizes on opposite projecting ends of said extending shafts, a gear train disposed in the gear housing connecting said shafts to drive the same at predetermined related speeds, an electric motor for driving said gear train, a transport mechanism for each film synchronized with said extending shafts whereby to permit effective transporting of either film without adjustment of any of the transporting mechanism therefor, a separate lens system for each film and means for directing light from the light source to either one of said lens systems.

23. In a projector of the character described, a light housing, a light source in said housing, a gear housing secured to said light housing and having a plurality of shafts projecting entirely therethrough so as to extend at opposite sides thereof, feed and take-up mechanism for films of different sizes on opposite projecting ends of said extending shafts, a gear train disposed in the gear housing connecting said shafts to drive the same at predetermined related speeds, an electric motor for driving said gear train, a transport mechanism for each film synchronized with said extending shafts whereby to permit effective transporting of either film without adjustment of any of the transporting mechanism therefor, a separate lens system for each film and means for directing light from the light source to either one of said lens systems, said last mentioned means functioning to place said light source at effectively a greater distance from the larger film than from the smaller film.

24. In a projector of the character described, a frame body comprising a lamp housing, a gear casing and a gear casing extension, a light source at one side of said light housing substantially in line with a framing aperture for framing a picture on a film of relatively small size, a condensing lens system between the light source and said framing aperture, a condenser lens system adjacent a framing aperture for framing a picture of relatively large size spaced from said first mentioned framing aperture, a mirror for receiving light from said light source and delivering the same to the second mentioned condenser lens system positioned so that the total path through which the light travels through second condenser lens system is substantially greater than the length of the light path through the first mentioned lens system, whereby the length of the light beam and the condensing lenses employed together will produce optimum lighting conditions for each of two sizes of film, a rotatable support for said lamp, said rotatable support permitting directing the light from the light source to either lens system, a plurality of shafts extending through said gear housing extension, film transporting sprockets at said projecting ends of said shafts, two claw mechanisms, one for each size of film and both continuously operated from said shafts, whereby either size of film may be mounted for operation on the projector without mechanical adjustments of any kind, the sole adjustment comprising rotating said light support to direct the light through the lens system corresponding to the film being used.

25. In a projector of the character described, a frame body comprising a lamp housing, a gear casing and a gear casing extension, a light source at one side of said light housing substantially in line with a framing aperture for framing a picture on a film of relatively small size, a condensing lens system between the light source and said framing aperture, a condenser lens system adjacent a framing aperture for framing a picture of relatively large size spaced from said first mentioned framing aperture, a mirror for receiving light from said light source and delivering the same to the second mentioned condenser lens system positioned so that the total path through which the light travels through second condenser lens system is substantially greater than the length of the light path through the first mentioned lens system, whereby the length of the light beam and the condensing lenses employed together will produce optimum lighting conditions for each of two sizes of film, a rotatable support for said lamp, said rotatable support permitting directing the light from the light source to either lens system, a plurality of shafts extending through said gear housing extension, film feed and take-up sprockets at said projecting ends of said shafts, two transport mechanisms, one for each size of film and both continuously operated from said shafts whereby either size of a film may be mounted for operation on the projector without mechanical adjustments of any kind, the sole adjustment comprising rotating said light support to direct the light through the lens system corresponding to the film being used.

26. In a projector of the character described, a frame body comprising a lamp housing, a gear casing and a gear casing extension, a light source at one side of said light housing substantially in line with a framing aperture for framing a picture on a film of relatively small size, a condensing lens system between the light source and said framing aperture, a condenser lens system adjacent a framing aperture for framing a picture of relatively large size spaced from said first mentioned framing aperture, a mirror for receiving light fom said light source and delivering the same to the second mentioned condenser lens system positioned so that the total path through which the light travels through second condenser lens system is substantially greater than the length of the light path through the first mentioned lens system, whereby the length of the light beam and the condensing lenses employed together will produce optimum lighting conditions for each of two sizes of film, a rotatable support for said lamp, said rotatable support permitting directing the light from the light source to either lens system, a plurality of shafts extending through said gear housing extension, film feed and take-up sprockets at said projecting ends of said shafts, two transport mechanisms, one for each size of film and both continuously operated from said shafts, a single shutter synchronized with said transport mechanisms mounted to control the light passing through both lens systems, whereby either size of film may be mounted for operation on the projector without adjustment of any of the mechanical parts.

27. In a projector of the character described, a gear casing, a train of gears therein, shafts connected to said gears extending through said casing, film transporting means for films of larger and smaller size associated with said shafts, including sprockets on projecting opposite ends of said shafts, casing extensions above and below said gear casing, shafts extending through ends of said casing extensions with the extending ends constructed to receive supply and take-up reels for films of large and small size at opposite sides of the said casing extensions and drive means connected to said shafts within said casing extensions, including overrunning clutches for driving said pulleys, said driving means provided with a friction connection.

28. In a projector of the character described, a gear casing, a train of gears therein, shafts connected to said gears extending through said casing, film transporting means for films of larger and smaller size associated with said shafts, including sprockets on projecting opposite ends of said shafts, casing extensions above and below said gear casing, shafts extending through ends of said casing extensions with the extending ends constructed to receive supply and take-up reels for films of large and small size at opposite sides of the said casing extensions and drive means connected to said shafts within said casing extensions, including overrunning clutches for driving said pulleys, said driving means provided with a friction connection, said reel shafts being in two parts, one part for supporting the reel for the smaller size film and one part being journalled in a removable portion of the casing extension, said two reel parts being clutch connected together, whereby said casing extension may be removed to also remove the shaft for carrying the reel for the larger size of film.

29. In apparatus for projecting pictures from either one of a pair of films of different size, film transporting mechanism for each film, a pair of picture frames, one arranged respectively adjacent each film, a lens system, including a light collecting and condensing lens system for each film, a projection lamp positioned adjacent the condensing lens system for the smaller of the two films so that the said lamp, condenser lens, picture frame and smaller film are mutually aligned, means for rotating the projecting lamp to direct the light therefrom at ninety degrees away from the said smaller condenser lens system, reflecting means aligned with the larger film and its frame for receiving light from the said lamp and directing it to the lens system of the larger film, whereby the light path between the lamp and larger film is longer than between the lamp and smaller film, and means associated with the lamp for concentrating and directing the light from the lamp to the lens system being used while shielding the light from the lens system not being used.

30. In apparatus for projecting pictures from either one of a pair of films of different sizes, film transporting mechanism for each film, a pair of picture frames, one arranged respectively adjacent each film, a lens system, including a light collecting and condensing lens system for each film, a projection lamp positioned adjacent the condensing lens system for the smaller of the two films so that the said lamp, condenser lens, picture frame and smaller film are mutually aligned, means for rotating the projecting lamp to direct the light therefrom at ninety degrees away from the said smaller condenser lens system, reflecting means aligned with the larger film and its frame for receiving light from the said lamp and directing it to the lens system of the larger film, whereby the light path between the lamp and larger film is longer than between the lamp and smaller film, and means associated with the lamp for concentrating and directing the light from the lamp to the lens system being used while shielding the light from the lens system not being used, a portion of the lens system for the larger film being disposed between the said lamp and the said reflecting means.

LEO FRANKEL.